United States Patent [19]
Bell

[11] 3,900,397
[45] Aug. 19, 1975

[54] FUEL TANK FILTER
[75] Inventor: Rupert B. Bell, Grosse Pointe, Mich.
[73] Assignee: R. L. Kuss & Co., Inc., Findlay, Ohio
[22] Filed: June 10, 1974
[21] Appl. No.: 477,659

[52] U.S. Cl. ............... 210/128; 210/172; 210/194; 210/416; 210/460
[51] Int. Cl.² ......................................... B01D 35/02
[58] Field of Search ............ 210/167, 172, 194–196, 210/411, 412, 416, 460, 128; 417/370

[56] References Cited
UNITED STATES PATENTS

| | | | |
|---|---|---|---|
| 2,788,125 | 4/1957 | Webb............................ | 210/460 X |
| 3,023,905 | 3/1962 | McDougal et al. ............ | 210/460 X |
| 3,108,065 | 10/1963 | McMichael..................... | 210/460 X |
| 3,301,402 | 1/1967 | Falkenberg et al............ | 210/460 X |
| 3,734,292 | 5/1973 | Bell................................ | 210/460 X |
| 3,738,489 | 6/1973 | Kraemer....................... | 210/411 X |

FOREIGN PATENTS OR APPLICATIONS

| | | | |
|---|---|---|---|
| 611,627 | 10/1926 | France............................. | 210/411 |

*Primary Examiner*—Samih N. Zaharna
*Assistant Examiner*—Robert H. Spitzer
*Attorney, Agent, or Firm*—Owen & Owen Co.

[57] ABSTRACT

A dual tube in-tank fuel filter for use in an automobile fuel system is disclosed. The filter has both an inlet tube and an outlet tube extending into its interior. Connected to the outlet tube, which extends nearly to the lower or upstream end of the filter, is the fuel feed line of the system leading from the fuel tank to a fuel pump having a fluid bypass and return. When the needle valve of the system's carburetor closes, the fuel pump bypasses the carburetor and returns fuel from the fuel pump through a fuel return line back to the fuel tank. Instead of dumping the return fuel directly to the fuel tank, the fuel return line is connected to the inlet tube of the fuel filter. The short fuel inlet tube thus feeds return fuel to the interior of the fuel filter where it is recirculated into the outlet tube substantially without passing through the filter's mesh. Continuous fuel flow through the fuel lines and fuel pump is thereby maintained without continuous draw through the filter's mesh, resulting in zero pressure drop through the mesh, so that the mesh may be cleaned by sloshing of fuel in the tank during periods when the carburetor's needle valve is closed.

4 Claims, 4 Drawing Figures

PATENTED AUG 19 1975 3,900,397
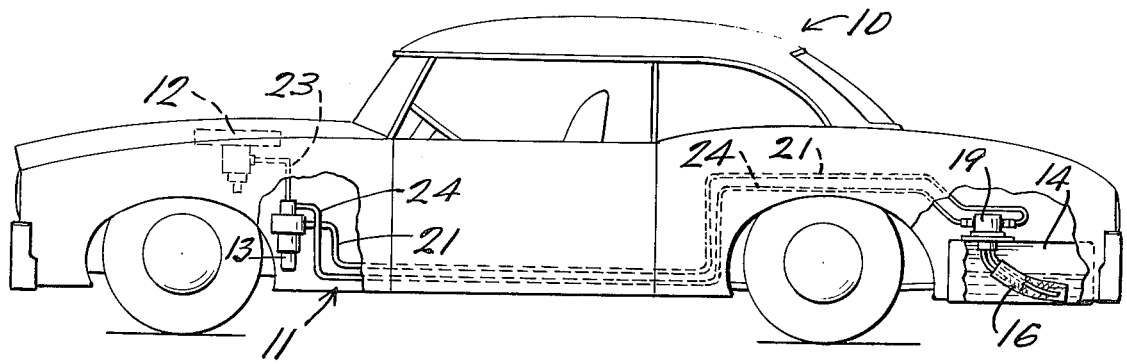
FIG-1-
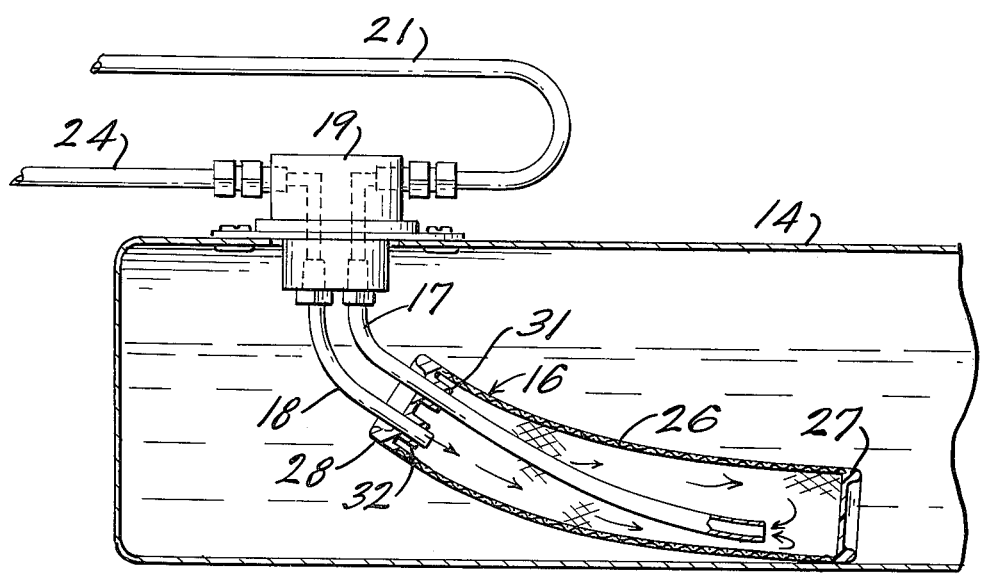
FIG-2-
FIG-3-
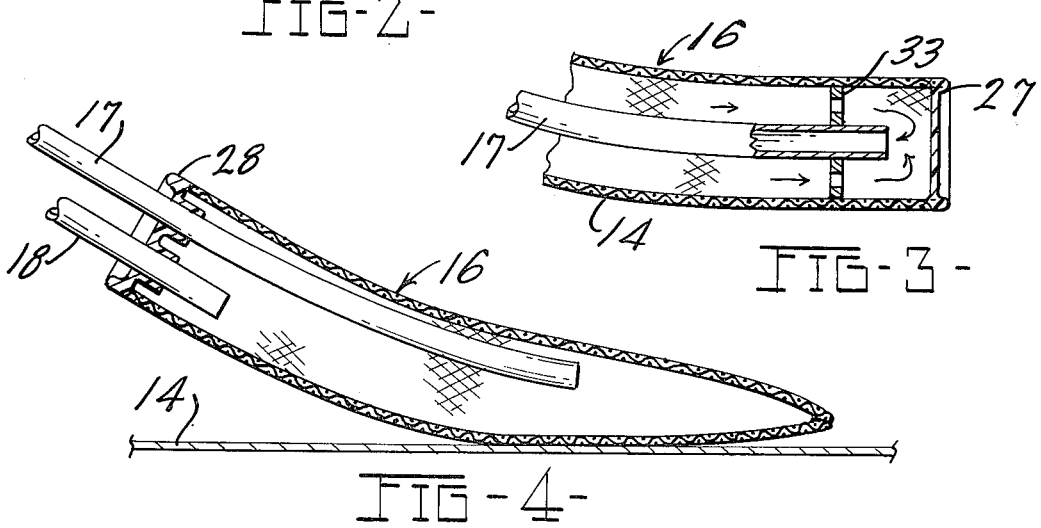
FIG-4-

FUEL TANK FILTER

BACKGROUND OF THE INVENTION

The invention relates generally to automotive fuel systems, and more particularly to an improved fuel system wherein a continuous flow of fuel is provided and the fuel tank filter is self-cleaning.

Automotive fuel systems generally incorporate a fuel filter connected to the end of the fuel pickup line within the fuel tank. The filter may be capable of separating water, as well as particulate matter, from fuel as shown in U.S. Pat. No. 2,788,125. In the usual systems, a fuel pump downstream draws fuel from the tank through the filter and pumps it into the carburetor, but only during periods when the carburetor needle valve is open. When the engine is consuming fuel at a very low rate, such as during downhill travel of the vehicle, the carburetor needle valve is closed and the fuel pump ceases to transfer fuel. When this happens, the fuel flow and pressure drop across the fuel tank filter mesh goes to zero, permitting slosh or waving action of the fuel in the fuel tank to clean the filter mesh of filtrate particles. This cleaning action does not occur during periods of flow through the filter mesh.

In such systems difficulty has arisen in regard to the stoppage of fuel flow within the fuel pump and the fuel line leading thereto. The stationary fuel can become heated and partially vaporized, particularly in the fuel pump, due to its proximity to the automobile engine which may drive numerous accessories and emission control equipment within the same confined area. The vaporization of the fuel within the fuel line and the fuel pump results in a condition commonly known as vapor lock, wherein primarily fuel vapors reach the engine and the engine starves for fuel.

As a solution to the fuel vaporization problem, one automotive practice has been to employ a fuel return line from the pressure side of the fuel pump back to the fuel tank. The fuel pump is provided with a bypass valve which bypasses the fuel into the fuel return line in response to closing of the carburetor needle valve and stoppage of fuel flow into the carburetor. Thus, a continual flow of fuel from the tank through the fuel pump and back to the tank is provided, preventing fuel in the fuel feed line and the fuel pump from overheating. See, for example, U.S. Pat. No. 2,942,732.

In such a system, however, there is a constant flow of fuel through the fuel tank filter, eliminating any periods of zero pressure drop across the filter mesh and thereby preventing effective self-cleaning of the filter mesh. Consequently, many such fuel systems employ very large tank filters with greatly increased mesh area in an attempt to defray the effects of mesh clogging.

U.S. Pat. No. 2,367,055 shows a system wherein fuel not pumped into the carburetor is returned to a rather complex structure within the tank. The structure includes a pressure relief valve, a venturi tube and filter screens and is intended to prevent the use of negative pressures to draw fuel from the tank to the fuel pump. Such a system would seem to overcome the above problem, but its use necessitates a powerful, heavy-duty fuel pump for pumping fuel through the restrictions of the tank device and for successfully operating the venturi. Such a fuel pump causes an undesirable power drain on the automobile engine and the filter structure within the tank is expensive.

Another fuel system designed to overcome the above problem is disclosed in my earlier U.S. Pat. No. 3,734,292. The system disclosed in that patent includes an electrical fuel pump suspended within the fuel tank and provided with a closed recirculation system entirely within the pump itself, so that fuel flow through the upstream fuel tank filter does cease during periods of zero fuel takeup in the carburetor. However, this system requires that the fuel pump be placed within the tank, a location remote for servicing, and that an electric fuel pump be used; the present invention is intended to accomplish the objectives of maintaining constant flow in the fuel line to eliminate vapor lock, to reduce pressure drop on the filter to permit self-cleaning by sloshing, and to accomplish these goals by use of a simple and inexpensive structure capable of use with conventional, engine-located fuel pumps.

SUMMARY OF THE INVENTION

The present invention provides a fuel tank filter for use primarily in an automotive fuel system of the type employing an engine-operated mechanical fuel pump which includes a bypass and return line for returning fuel to the fuel tank during periods of carburetor valve closure. The generally cylindrical fuel tank filter includes both an outlet tube and an inlet tube extending into its interior. The outlet tube, which extends into the upstream or lower end of the fuel filter, is connected to the fuel feed line leading to the fuel pump, while the inlet tube, which extends to just inside the filter's upper end, is connected to the bypass fuel return line from the fuel pump. When the carburetor inlet valve closes and the continuously operating fuel pump recirculates fuel back to the fuel tank, the return fuel exits the inlet tube at the upper end of the tank filter, travels within the filter to the end of the outlet tube, and re-enters the outlet tube for transmission back to the fuel pump. As a result, no fuel passes in either direction through the fuel tank filter mesh during such periods of recirculation, the pressure drop across the screen is reduced to zero, and the sloshing fuel in the tank has a chance to clean the clogging filtrate material off the filter mesh. With such effective self-cleaning, the filter may be of a small size without great mesh area.

BRIEF DESCRIPTION OF THE DRAWINGS

FIG. 1 is a broken diagrammatic view of an automobile having a fuel system employing a fuel tank filter according to the present invention;

FIG. 2 is a sectional view of the vehicle fuel tank showing the filter with inlet and outlet tubes connected to fuel lines leading to and from the fuel tank;

FIG. 3 is a partial sectional view of the end of the filter showing an alternate construction of the filter of FIG. 2 having an internal support for the lower end of the outlet tube; and FIG. 4 is a partial sectional view similar to FIG. 2 but showing an alternate construction of a two-tube filter having a flattened or fishtail lower end.

DESCRIPTION OF THE PREFERRED EMBODIMENT

In FIG. 1 an automobile 10 is diagrammatically indicated having a fuel system generally identified by the reference number 11. Included within the fuel system 11 are a carburetor 12, a fuel pump 13 and a fuel tank 14 within which is a fuel filter 16 according to the present invention. The fuel filter 16 includes an outlet tube 17 and an inlet tube 18, best seen in FIG. 2. The outlet tube 17 is connected, through a tank connector 19, to a fuel feed line 21 which extends forward in the automobile 10 to a fuel pump 13. A fuel line 23 from the pressure side of the fuel pump 13 conveys fuel to the carburetor 12, which includes a needle valve (not shown) effective to slow or stop the flow of fuel through the feed line 23 during periods of low engine fuel consumption. A fuel return line 24 also extends from the pressure side of the fuel pump 13, and the system includes bypass means (not shown) at the pump 13, the carburetor 12 or therebetween for diverting the flow of pumped fuel into the line 24 when the carburetor needle valve has slowed or stopped the flow of fuel through the feed line 23. The fuel return line 24 extends rearwardly to the fuel tank 14, where it is connected to the fuel filter inlet tube 18 through the fuel tank connector 19. Fuel systems having such a bypass feature are known in the art and do not constitute a part of this invention.

As indicated in FIG. 2, the double-tubed fuel filter 16 includes a generally cylindrically-wrapped filter mesh 26 which is supported by an upstream or lower end spool 27 and a downstream or upper end spool 28. The filter 16 is shown flexed in contact with the bottom of the tank 14, as disclosed in commonly-owned co-pending application Ser. No. 370,017 filed June 14, 1973 now U.S. Pat. No. 3,826,372. However, the filter 16 may be oriented in any conventional manner in the tank 14.

The downstream end spool 28 of the present filter 16 includes an opening 31 for the outlet tube 17 and an opening 32 for the inlet tube 18, both of which tubes are preferably pressfit into place within the filter 16. The outlet tube 17 is shown extending almost to the upstream or lowermost end of the filter 16, as is conventional in some fuel tank filters. The inlet tube 18, on the other hand, is shown extending to a position just inside the downstream spool 28. The purpose of this is to enable recirculated fuel exiting the inlet tube 18 to decelerate within the filter 16 in its movement toward the open end of the outlet tube 17. However, the tubes 17 and 18 may each extend just inside the downstream spool 28 or to almost any length within the filter 16 with effective fuel circulation therebetween resulting. Substantially all of the return fuel is thus kept within the filter mesh 26 during periods when the carburetor needle valve is closed, with substantially no fuel passing through the filter mesh 26. With little or no fuel entering the filter or leaving it during such periods of recirculation, the pressure differential on either side of the filter mesh drops to substantially zero. The filter mesh 26 is therefore able to be cleaned by wave or sloshing action of fuel in the tank 14 during such periods of low engine gas consumption.

FIG. 3 illustrates a variation of the two-tube filter embodiment of FIG. 2 in which the free end of the outlet tube 17 is positioned within the lower end of the filter 16 by an annular collar 33 which may be loosely slipped over the tube 17 and placed within the filter 16 prior to the upper end spool being molded in place to close the filter, etc. Such an internal support may be desirable to prevent the end of the tube 16 from wearing against the inner surface of the filter mesh and to keep it axially or centrally positioned within the filter 16. As an alternative, the annular disc 33 can be molded as a recess or other alignment means on the inner face of the lower end spool 27.

If the filter is to be of the flexible type which is installed in biased contact with the bottom of the tank 14, as described in the aforesaid co-pending application, the lower end of outlet tube 17 can be pre-curved to approximate the configuration of the installed filter or it can be made flexible itself. If the lower end of the tube 17 is made of a flexible material, then the entire installation can be adapted for different shaped tanks by varying the angle of the rigid upper end of the tubes 17 and 18.

FIG. 4 schematically shows a two-tube filter of the instant invention as it would be used in filters having a flattened end or fishtail construction. This construction is popular because of its low cost which eliminates the molded lower end spool 27 and merely seals together the end edges of the filter mesh, in the manner of a toothpaste tube construction. Again, it may be desirable to provide an annular spacer or support member similar to that shown in FIG. 3 for this embodiment.

The embodiment described in detail above provides simple and economical structure for reducing the possibility of vapor lock in an automotive fuel system while at the same time providing for self-cleaning of the fuel filter within the tank. It will be appreciated by those skilled in the art that numerous modifications and changes may be made without departing from the scope of the invention as defined in the appended claims.

I claim:

1. In an automobile fuel system having a fuel tank, a fuel feeding means for introducing fuel to the vehicle engine including a stop valve for terminating the flow of fuel to the fuel feeding means, a fuel pump, a fuel pump line connecting the fuel pump with the fuel feeding means and a fuel feed line connecting the fuel tank with the inlet side of the fuel pump, and means for bypassing the fuel pump line in response to the closing of the stop valve, the improvement comprising a fuel filter within the fuel tank, said fuel filter having a filtering mesh and closure means defining an interior with upstream and downstream ends and an outlet tube and an inlet tube extending into the interior, means operably connecting said outlet tube with said fuel feed line, and means operably connecting said inlet tube with the bypassing means, whereby upon closure of the stop valve of the fuel feeding means, substantially all of the fuel returned by the bypassing means exits said inlet tube within said filter and re-enters said outlet tube, a substantially zero pressure drop occurs across the filtering mesh, and the filtering mesh is cleaned of filtrate material by sloshing action of the fuel in the tank.

2. The filter of claim 1 wherein said inlet tube extends to a position just inside the downstream end of the filter.

3. The filter of claim 2 wherein said outlet tube extends to a position adjacent the upstream end of the filter.

4. The filter of claim 3 wherein the lower end of said outlet tube within the filter is secured within the filter by a spacing member which prevents its contact with the interior surfaces of the filter.

* * * * *